US008844861B2

(12) United States Patent
Balk et al.

(10) Patent No.: US 8,844,861 B2
(45) Date of Patent: Sep. 30, 2014

(54) AIRCRAFT PROPULSION SYSTEM

(75) Inventors: Wouter Balk, Melun (FR); Anne-Laure Marie Clemence De Galle, Paris (FR)

(73) Assignee: SNECMA, Paris (FR)

( * ) Notice: Subject to any disclaimer, the term of this patent is extended or adjusted under 35 U.S.C. 154(b) by 416 days.

(21) Appl. No.: 13/001,172

(22) PCT Filed: Jun. 18, 2009

(86) PCT No.: PCT/FR2009/000737
§ 371 (c)(1),
(2), (4) Date: Mar. 24, 2011

(87) PCT Pub. No.: WO2010/007226
PCT Pub. Date: Jan. 21, 2010

(65) Prior Publication Data
US 2011/0168837 A1     Jul. 14, 2011

(30) Foreign Application Priority Data
Jun. 25, 2008   (FR) ..................................... 08 03553

(51) Int. Cl.
*B64D 29/00*     (2006.01)
*B64D 27/26*     (2006.01)
(52) U.S. Cl.
CPC .......... *B64D 27/26* (2013.01); *B64D 2027/264* (2013.01); *B64D 29/00* (2013.01); *Y02T 50/44* (2013.01); *B64D 2027/266* (2013.01)
USPC ......................................... 244/54; 244/53 R
(58) Field of Classification Search
CPC ............. B64D 27/26; B64D 2027/268; B64D 2027/264; B64D 27/18; B64D 29/00
USPC .......................... 244/53 R, 54; 248/554–555; 60/796–797
See application file for complete search history.

(56) References Cited

U.S. PATENT DOCUMENTS

| 3,675,418 | A | * | 7/1972 | Lenkeit et al. | .................. 60/797 |
| 4,603,821 | A | * | 8/1986 | White | .............................. 244/54 |
| 5,452,575 | A | * | 9/1995 | Freid | ................................ 60/797 |
| 5,642,615 | A | * | 7/1997 | Porte et al. | .................... 60/226.1 |
| 5,725,181 | A | * | 3/1998 | Hey | ................................. 244/54 |
| 5,860,275 | A | * | 1/1999 | Newton et al. | ............... 60/226.1 |
| 6,244,539 | B1 | * | 6/2001 | Liston et al. | .................... 244/54 |

(Continued)

FOREIGN PATENT DOCUMENTS

EP             1 571 080        9/2005

OTHER PUBLICATIONS

International Search Report issued Jan. 14, 2010 in PCT/FR09/00737 filed Jun. 18, 2009.

*Primary Examiner* — Rob Swiatek
*Assistant Examiner* — Timothy Schwarz
(74) *Attorney, Agent, or Firm* — Oblon, Spivak, McClelland, Maier & Neustadt, L.L.P.

(57) ABSTRACT

An aircraft propulsion system including a bypass turbojet engine surrounded by a nacelle together with a mechanism attaching the engine to a pylon of an aircraft. The nacelle includes an inner structure forming a body of revolution including a rigid framework formed by an upstream annular frame fastened to an intermediate casing of the engine, a downstream annular frame supporting the exhaust casing of the engine, and longitudinal arms connecting the frames together, the annular downstream frame being fastened to the pylon by a flexible or hinged suspension mechanism.

16 Claims, 4 Drawing Sheets

(56) References Cited

U.S. PATENT DOCUMENTS

| | | | |
|---|---|---|---|
| 6,708,925 B2* | 3/2004 | Udall | 244/54 |
| 6,843,449 B1* | 1/2005 | Manteiga et al. | 244/54 |
| 8,262,050 B2* | 9/2012 | Linz | 248/554 |
| 2005/0269444 A1 | 12/2005 | Marche | |
| 2006/0038065 A1* | 2/2006 | Howe et al. | 244/54 |
| 2009/0184198 A1* | 7/2009 | Balk | 244/54 |
| 2009/0189014 A1* | 7/2009 | Balk | 244/54 |

* cited by examiner

AIRCRAFT PROPULSION SYSTEM

BACKGROUND OF THE INVENTION

1. Field of the Invention

The present invention relates to an aircraft propulsion system comprising a bypass turbojet engine having at least a compressor, a combustion chamber, a turbine, and a fan mounted upstream from the compressor and driven in rotation by the turbine, the engine being surrounded by a nacelle that, downstream from the fan, defines an annular flow section for a secondary stream of air around the casings of the compressor, of the combustion chamber, and of the turbine, this secondary stream providing the major fraction of the thrust.

The propulsion system is attached to a structural element of an aircraft, such as a wing of the aircraft, by means enabling it to transmit to said structural element the forces that are generated by the engine during its various operating stages.

2. Description Of The Related Art

The turbojet engines of modern civilian airplanes are characterized by a large bypass ratio, i.e. a ratio of secondary flow rate divided by primary flow rate that is greater than 5 and that may be as much as 9 or 10, in particular for the purpose of reducing the noise nuisance and reducing the fuel consumption of such engines. This gives rise to a reduction in the transverse dimensions of the turbojet engine between the fan and the turbine ("wasp waist" effect) that reduces the bending strength of the body.

Bending deformations of the body of the turbojet themselves give rise to deformations of the casing around the rotor, causing the casing to be ovalized, thereby reducing the clearances between the casing and rotor at certain locations and increasing the clearances at other locations ("casing distortion" effect).

This effect reduces the performance of the turbojet, in particular because it makes it necessary to provide larger clearances at the tips of the blades.

The means for attaching the propulsion system generally comprise a strong and massive part commonly referred to as a pylon or strut, together with suspension means connecting the engine to the pylon. Such suspension means are conventionally fastened firstly to one or more casings of the engine, e.g. upstream on an intermediate casing and downstream on an exhaust casing, and secondly on a bottom portion of the pylon that extends into the secondary flow section and that is generally surrounded by walls for guiding the secondary stream, thus forming what is sometimes called a "12o'clock divider".

Those known fastener means present several drawbacks.

Attaching the propulsion system to the airplane pylon via suspension means fastened to casings gives rise to pinching of the casings and enhances effects of distortion and misalignment of the various rotary elements of the engine, thereby leading to losses of efficiency and giving rise to an increase in fuel consumption.

Furthermore, take-up of the torsion torque induced by the rotation of the rotary elements of the engine via the downstream suspension requires attachment means to be used that are large and requires a 12 o'clock divider to be that much wider when a pylon penetrates at least in part into the secondary flow section.

For a given bypass ratio, that therefore requires the radial dimensions of the nacelle to be increased, thereby increasing drag and making it difficult to incorporate turbojets having a large bypass ratio.

BRIEF SUMMARY OF THE INVENTION

A particular object of the invention is to provide a solution to those problems that is simple, inexpensive, and effective, while serving to avoid the drawbacks of the prior art.

A particular object of the invention is to provide an airplane propulsion system in which the nacelle plays a structural role for stiffening the engine and limiting its mechanical distortion, and in which the means for suspending the engine from the aircraft serve to limit pinching and any concentrated force take-up at the body of the engine, and also to limit the size of the 12 o'clock divider around the pylon, while also providing good transmission of forces between the engine and the aircraft.

To this end, the invention provides an aircraft propulsion system comprising a bypass turbojet engine surrounded by a nacelle defining an annular flow space for a secondary stream, and means for attaching the engine to a pylon for fastening to a structural element of an aircraft, the downstream portion of the nacelle comprising an inner structure forming a body of revolution that defines the inside of the flow section for the secondary stream around the body of the engine, the system being characterized in that the inner structure of the downstream portion of the nacelle comprises a rigid framework formed by an upstream annular frame fastened by bolting to an intermediate casing of the engine, a downstream annular frame including support means for supporting an exhaust casing of the engine, and longitudinal arms connecting these frames together, and in that the annular downstream frame of the inner structure is fastened to the pylon by flexible or hinged suspension means.

The rigid framework of the inner structure of the downstream portion of the nacelle enables said structure to contribute to transmitting forces between the engine and the pylon, thereby playing a structural role so as to limit casing distortion phenomena in the engine.

Fastening the downstream annular frame of said framework to the pylon replaces the conventional fastening of the exhaust casing to said pylon, and makes it possible to avoid pinching at the exhaust casing.

The invention thus serves in particular to reduce clearances at the tips of the blades, and from a general point of view, to improve the performance of the propulsion system.

According to another characteristic of the invention, the exhaust casing support means comprise links regularly distributed around the axis of the engine having their radially inner ends hinged via ball joints to a rigid cylindrical wall of the exhaust casing, and their radially outer ends hinged via ball joints to the downstream annular frame of the inner structure of the nacelle, the links preferably extending substantially tangentially to the exhaust casing and in a plane perpendicular to the axis of the engine.

These links enable forces to be transmitted between the exhaust casing and the pylon, which force transmission is distributed around the axis of the engine, thereby limiting risks of local pinching at the casing while also taking good advantage of the structural properties of the downstream annular frame.

In a preferred embodiment of the invention:

- the suspension means for suspending the downstream annular frame comprise links hinged via ball joints and connecting the pylon to a top portion of the downstream frame, together with a thrust take-up connecting rod;
- the downstream annular frame comprises a channel-section ring forming an annular channel that is open radially outwards and that includes hinge means for the suspension links; and the suspension links comprise a three-point link of L-shape having one end of a long branch hinged via a ball joint to the downstream annular frame, and having one end of a short branch hinged to one end of another link whose other end is hinged by a ball joint to the downstream annular frame.

The links suspending the downstream frame to the pylon provide suspension that is flexible, limiting the risks of excessive stresses, and also present the advantage of being compact, in particular because they may extend in part within the channel of the downstream frame.

The thrust take-up connecting rod is preferably oriented axially downstream from the top portion of the downstream frame.

This configuration makes it possible to avoid having recourse to a thrust take-up connecting rod that passes through the inner structure of the nacelle.

According to another characteristic of the invention, the pylon has an upstream portion extending up to the intermediate casing of the engine and connected by three links that are hinged to a top portion of the intermediate casing, two of the links extending substantially radially, while a third link extends substantially tangentially to the intermediate casing.

These links serve to take up lateral and vertical forces and also the torsion torque induced by the rotation of the rotary elements of the engine, so there is no longer any need for the downstream suspension means to take up the torsion torque.

This makes it possible to reduce considerably the circumferential extent of the downstream suspension means and the size of the 12 o'clock divider around the pylon, and thus makes it possible to increase the bypass ratio of the engine for given overall size, or to reduce its overall size for constant bypass ratio.

In a preferred embodiment of the invention, the upstream and downstream annular frames of the inner structure of the nacelle are connected together by two longitudinal arms extending in a vertical plane containing the axis of the engine, and by two lateral longitudinal arms extending in a horizontal plane containing the axis of the engine.

According to another characteristic of the invention, fairing panels are fastened to the framework of the inner structure of the nacelle and include substantially longitudinal rigid walls for guiding the secondary stream around the pylon, these walls including flexible means connecting them to the pylon and, preferably, hatches giving access to engine services.

Because they are connected to the pylon, these longitudinal walls contribute to transmitting forces between the inner structure of the nacelle and the pylon.

The fairing panels may also comprise substantially longitudinal walls extending in a portion of the flow space for the secondary stream that is diametrically opposite from the pylon in order to guide the secondary stream around services for the engine.

The fairing panels advantageously include removable access hatches for facilitating maintenance operations on the engine.

The downstream annular frame and at least some of the longitudinal arms of the inner structure of the nacelle are made of an alloy including nickel, so as to give them good stiffness and mechanical strength, and also good ability to withstand high temperatures.

The upstream annular frame and the fairing panels of the inner structure of the nacelle are preferably made of titanium.

Selecting titanium makes it possible to reduce the weight of these elements of the inner structure of the nacelle, since there is no need for them to present the same performance in terms of stiffness and strength.

In a variant, in order to further reduce the weight of the inner structure, at least some of the elements selected from the access hatches of the fairing panels, the upstream annular frame, the longitudinal arms, and the fairing panels are made of composite material.

BRIEF DESCRIPTION OF THE SEVERAL VIEWS OF THE DRAWINGS

The invention can be better understood and other details, advantages, and characteristics thereof appear more clearly on reading the following description made by way of non-limiting example and with reference to the accompanying drawings, in which.

DETAILED DESCRIPTION OF THE INVENTION

Figure 1:
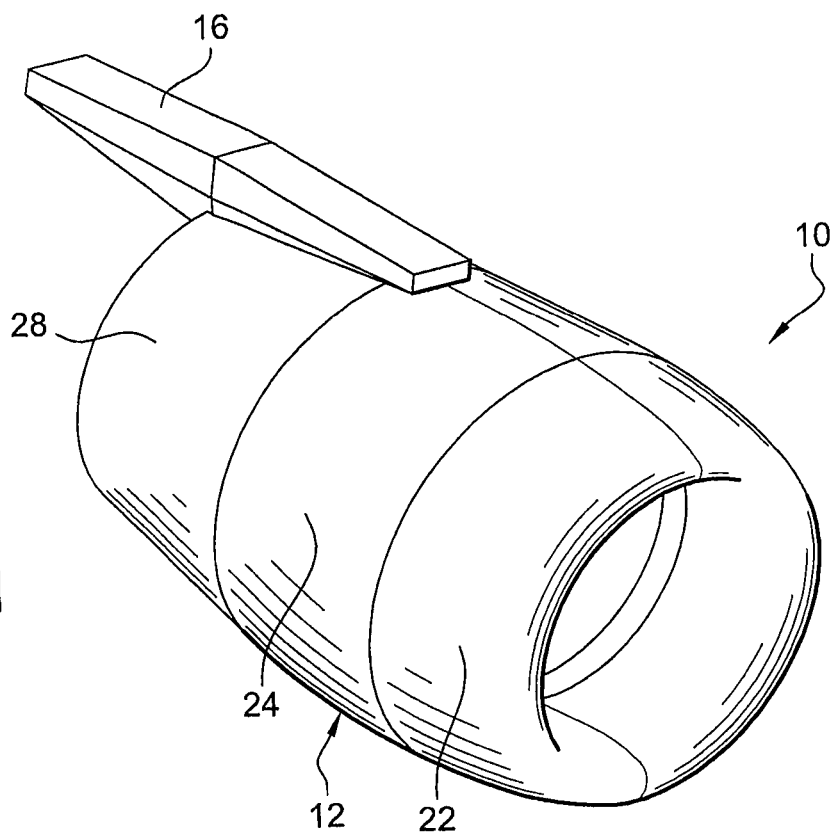
FIG. 1 is a diagrammatic perspective view from upstream of a propulsion system of the invention.
Figure 2:
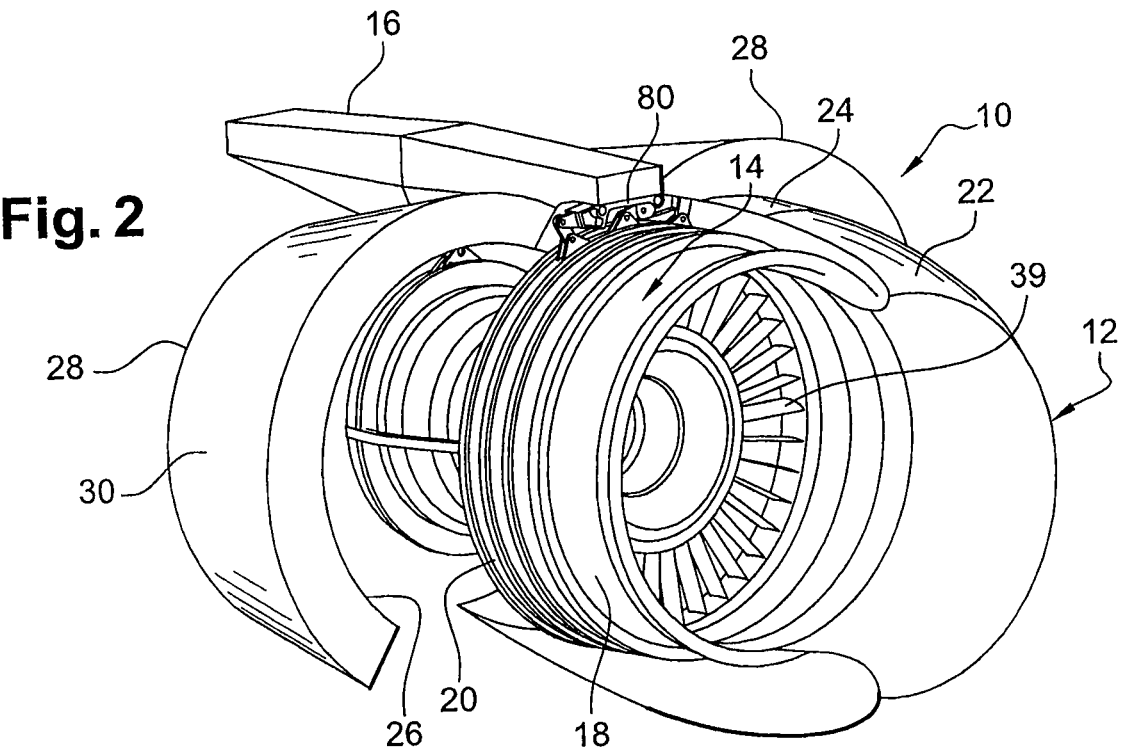
FIG. 2 is a diagrammatic and fragmentary perspective view from upstream of a propulsion system of the invention, with the two semicylindrical shells of the downstream outer jacket of the nacelle shown in an open position and with the fairing panels of the inner wall of the nacelle removed, the upstream fairing panels of the nacelle being shown partially cut away.

The aircraft propulsion system 10 shown diagrammatically in FIGS. 1 and 2 comprises a nacelle 12 of generally cylindrical shape, having mounted therein a bypass turbojet engine 14 that is suspended from a pylon 16 for fastening it under a wing of an aircraft.

At the front, the engine 14 has a fan wheel that is driven in rotation inside a fan casing 18 that is connected at its downstream end to an outer cylindrical wall 20 of an intermediate casing.

The nacelle 12 comprises, from its upstream end, semicylindrical fairing panels 22 (sometimes referred to as an air inlet sleeve) and semicylindrical fairing panels 24 surrounding the fan casing 18 and the outer wall 20 of the intermediate casing, and at its downstream end, an outer jacket 26 (sometimes referred to as an outer fixed structure (OFS)) that is made up of two semicylindrical shells 28 that are fastened to the outer wall 20 of the intermediate casing and that optionally include a thrust reverser, in known manner. The semicylindrical shells of the outer jacket 26 are hinged to the pylon 16 via hinges (not shown in the figures) and they are hinged to each other at their ends remote from the pylon 16 by means of hooks that co-operate with latches (not shown), and they are covered by cover panels 30 for providing continuity of the air flow around the propulsion system 10.

Figure 3:
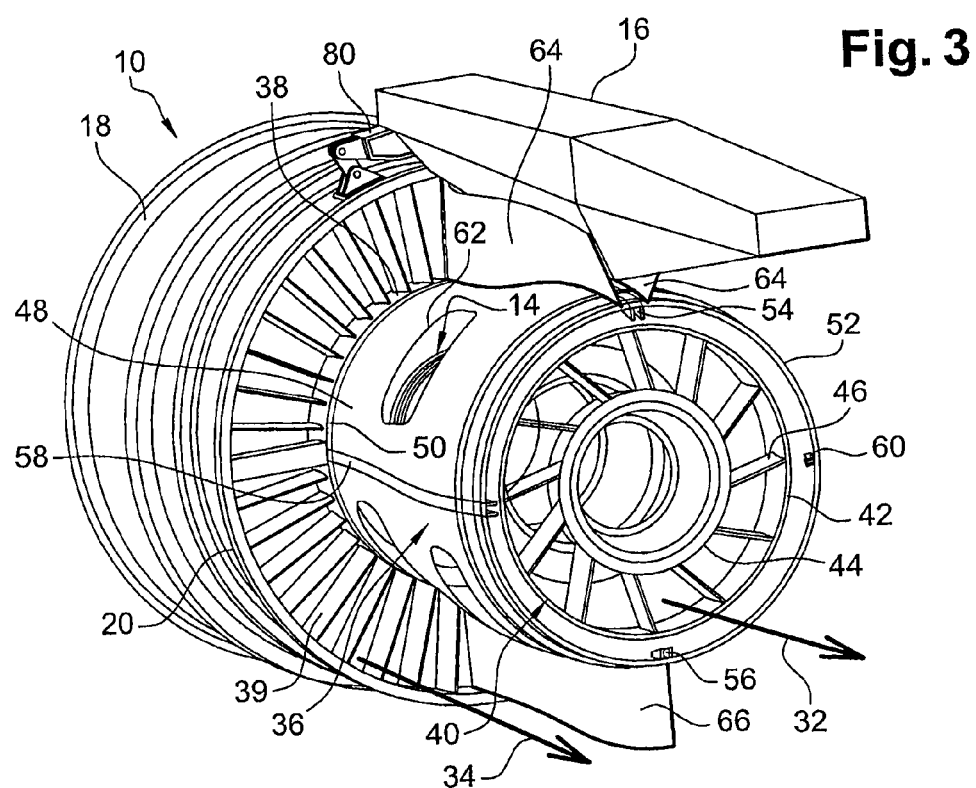
FIG. 3 is a fragmentary and diagrammatic view in perspective from downstream showing the propulsion system of FIG. 1, including the fairing panels of the inner wall of its nacelle, and with the outer wall of the nacelle cut away.

As shown diagrammatically in FIG. 3, the stream of air sucked in by the fan is shared downstream from the fan between a primary stream 32 passing through the engine 14 that comprises from upstream to downstream: a compressor; a combustion chamber; and a turbine; and a secondary stream 34 that flows between the body of the engine 14 and the outer jacket 26 of the nacelle, and that provides the majority of the thrust in addition to the thrust provided by the combustion gas 32 ejected from the turbine.

Downstream from the intermediate casing, the flow section for the secondary stream 34 is defined on the outside by the outer jacket 26 of the nacelle, and on the inside by an internal structure of the nacelle forming a body of revolution 36 that is sometimes known as the inner fixed structure (IFS), that surrounds the body of the engine, and that extends from an inner cylindrical wall 38 of the intermediate casing connected to its outer wall 20 by stator vanes 39, to an exhaust casing 40 situated at the outlet from the turbine and comprising, in conventional manner, two coaxial cylindrical walls, respectively an outer wall 42 and an inner wall 44 that are connected together by radial arms 46.

The inner structure 36 of the nacelle 12 has a rigid framework on which the fairing panels 48 are fastened.

As can be seen more clearly below, the framework comprises two annular frames, respectively an upstream frame 50 and a downstream frame 52, that are interconnected by four longitudinal arms, comprising two arms 54 and 56 that extend in a vertical plane containing the axis of the engine, and two lateral arms 58 and 60 that extend in a horizontal plane containing the axis of the engine.

The fairing panels 48 fastened to the framework comprise for example four panels in the form of portions of a cylinder interconnecting the longitudinal arms 54, 56, 58, and 60 in pairs and including openings 62 suitable for being closed by removable hatches for giving access to the body of the engine during maintenance operations. In a variant, the fairing panels 48 may for example comprise two semicylindrical panels interconnecting the longitudinal arms 54 and 56.

At its end that is fastened to the longitudinal arm 54 extending along the top of the engine, each of the two panels 48 connected to said arm 54 includes a wall 64 that extends longitudinally towards the pylon 16 in order to guide the secondary stream 34 around the pylon. These two guide walls 64 thus form a divider (sometimes referred to as a 12 o'clock divider) serving to limit head losses in the secondary stream 34 where it goes past the pylon 16.

In analogous manner, at their ends that are fastened to the longitudinal arm 56 that is diametrically opposite from the pylon 16, the two panels 48 connected to said arm 56 include walls 66 for guiding the secondary stream that form a closed space, (sometimes referred to as a 6 o'clock divider) through which engine equipment and services can pass.

The upstream annular frame 50 is fastened by bolting to the inner wall 38 of the intermediate casing.

Figure 4:
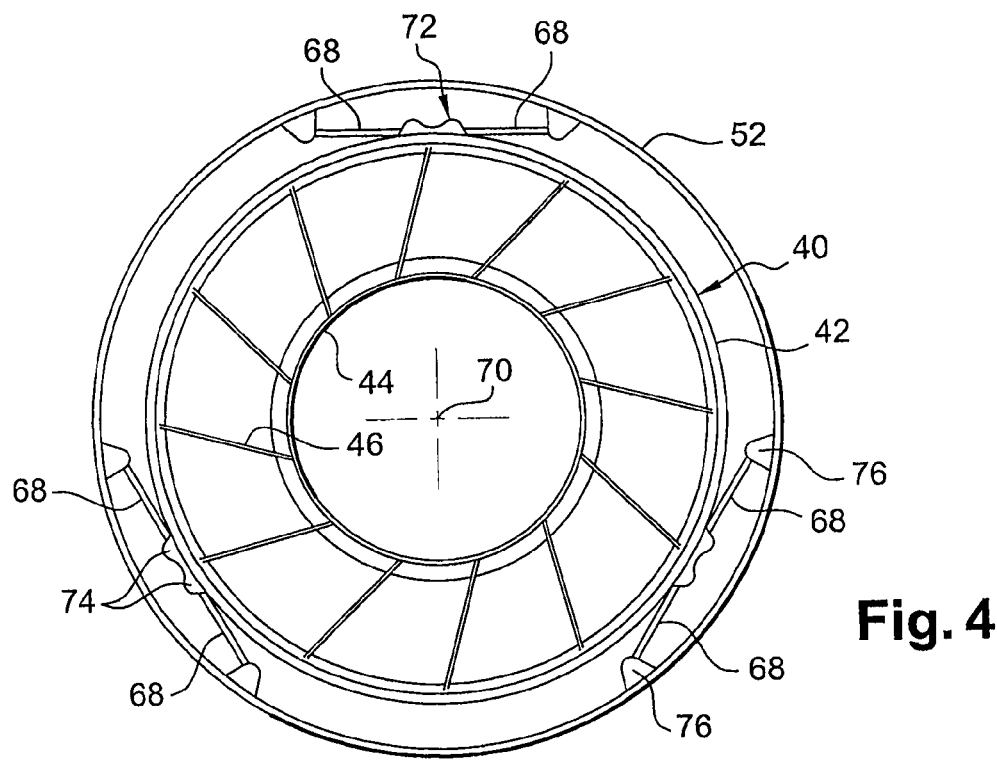
FIG. 4 is a fragmentary and diagrammatic view of the propulsion system of FIG. 1 in section in the plane of the downstream annular structure of the inner wall of its nacelle.

As shown in FIG. 4, the exhaust casing 40 is connected to the downstream annular frame 52 of the inner structure 36 of the nacelle by force-transmission links or rods 68 that are regularly distributed around the axis 70 of the engine and that have their radially inner ends hinged to the outer wall 42 of the exhaust casing and their radially outer ends hinged to the downstream annular frame 52.

In the example shown, there are six links 68 and all of them lie in a common transverse plane, the links being joined together in pairs at the hinge points 72 between their radially inner ends and the exhaust casing 40, these hinge points 72 comprising two juxtaposed forks 74, for example. The radially outer ends of the links 68 are mounted in forks 76 that are formed by or fastened on the inside surface of the downstream annular frame 52, and that are disposed in such a manner that the two links of each pair extend substantially tangentially to the outer wall 42 of the exhaust casing at their hinge points 72 with said wall.

The ends of the links 68 are mounted in the forks 74 and 76 by ball joints so that the links 68 serve to support and center the exhaust casing 40 while accommodating axial and radial differential expansions between said casing and the framework of the inner structure 36 of the nacelle.

Figure 5:
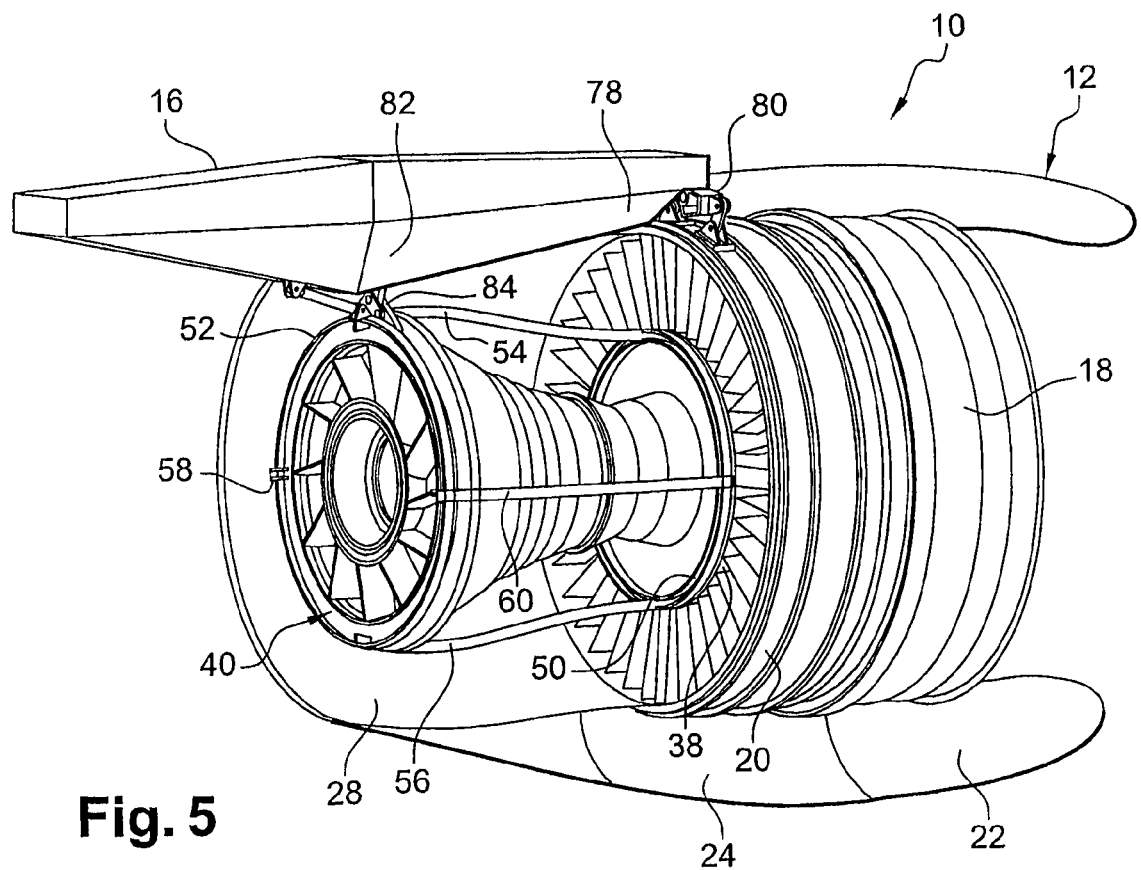
FIG. 5 is a fragmentary and diagrammatic perspective view of the side of the FIG. 1 propulsion system from which the fairing panels of the inner wall of the nacelle have been removed, and with the outer wall of said nacelle cut away.

As can be seen more clearly in FIG. 5, showing the propulsion system 10 after the fairing panels 48 of the inner structure 36 of the nacelle have been removed, the pylon 16 has an upstream portion 78 extending as far as the intermediate casing of the engine and carrying suspension means 80 hinged to a top portion of the outer wall 20 of said intermediate casing, and a downstream portion 82 connected to suspension means 84 hinged to the downstream annular frame 52 of the inner structure 36 of the nacelle.

Figure 6:
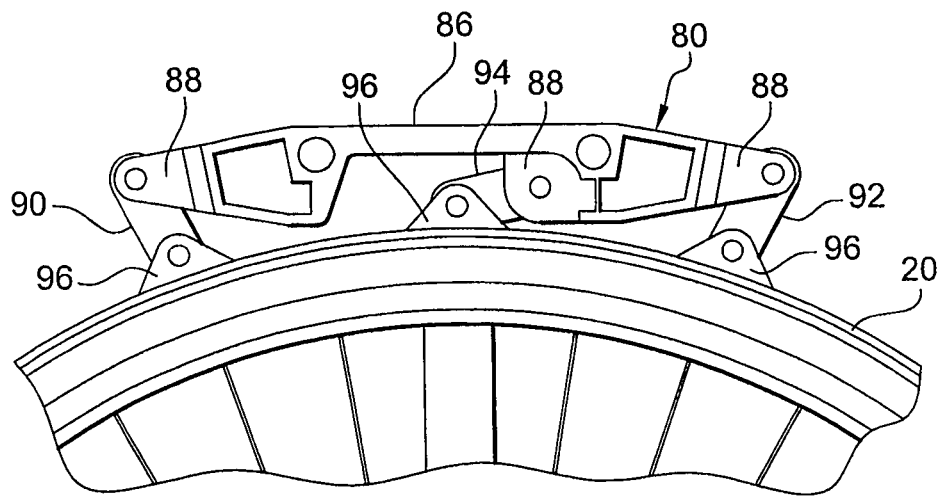
FIG. 6 is a fragmentary and diagrammatic view in section of the propulsion system of FIG. 1 showing the upstream suspension means for suspending the engine on the pylon.

The upstream suspension means 80 are shown in greater detail in FIG. 6, and they comprise a connection member 86 fastened to the upstream portion 78 of the pylon 16 and extending transversely, tangentially to the top of the outer wall 20 of the intermediate casing, this member 86 including fastener means 88 of fork or analogous type for fastening to three links 90, 92, and 94 that are connected to the wall 20 of the intermediate casing. Each link 90, 92, and 94 has one of its ends mounted via a ball joint in one of the fastener means 88 of the connection member 86 and has its other end mounted, likewise via a ball joint, in a fork 96 that is formed by or fastened on the outer surface of the wall 20 of the intermediate casing. Two links 90 and 92 hinged to the ends of the connection member 86 extend substantially radially, while the third link 94, hinged to the intermediate portion of the connection member 86 extends substantially tangentially to the wall 20 of the intermediate casing, so that the upstream suspension means 80 are suitable for taking up lateral and vertical forces, and also the torsion torque exerted by the engine.

Figure 7:
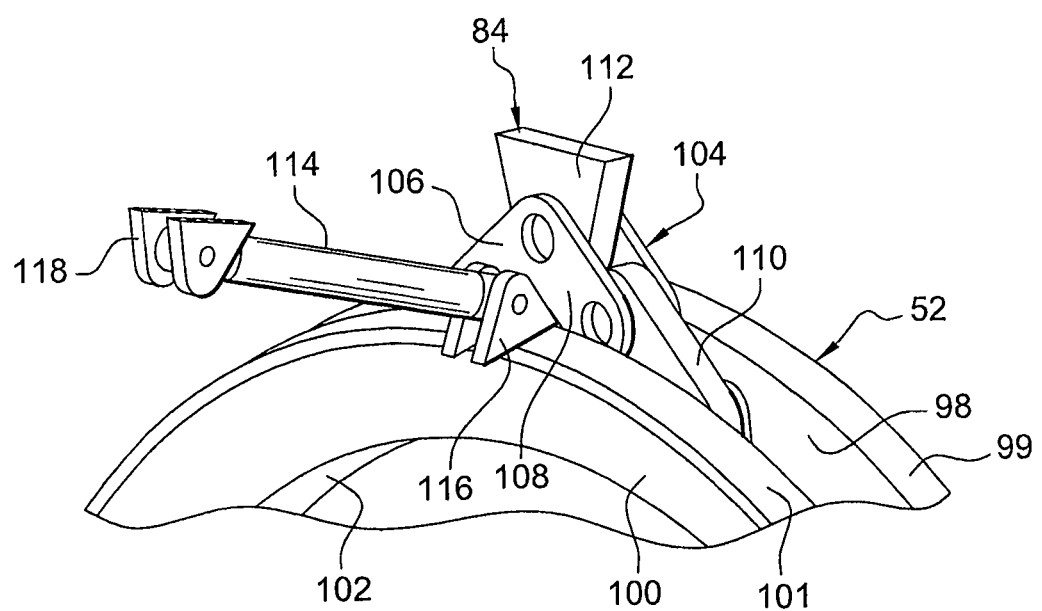
FIG. 7 is a fragmentary and diagrammatic perspective view from downstream of the propulsion system of FIG. 1, showing the downstream suspension means for suspending the engine on the pylon.

As shown in FIG. 7, the downstream annular frame 52 of the inner wall 36 of the nacelle includes a channel-section ring having two radial annular walls, respectively an upstream wall 98 and a downstream wall 100, forming the flanges of its channel and connected together at their radially inner ends by an annular wall 102 extending axially and forming the web of the channel. Each of the radial annular walls 98 and 100 has an annular rim respectively referenced 99 or 101, extending axially outwards from the annular channel.

The downstream suspension means 84 comprise a three-point link 104 of L-shape with one end of a long branch 106 hinged in the channel of the downstream annular frame 52, and with one end of a short branch 108 hinged to one end of another link 110 whose other end is hinged in the channel of the downstream annular frame 52, the top of the three-point link 104 being hinged to a radial fastener tab 112 of the downstream portion 82 of the pylon 16.

The downstream suspension means 84 also include a thrust take-up connecting rod 114 hinged at one of its ends to a fork 116 formed by or fastened on a top portion of the rim 101 of the downstream radial wall 100 of the annular frame 52 and extending downstream from said end, the other end of the connecting rod being hinged to a fork 118 fastened to the pylon 16.

In the prior art, the exhaust casing is connected directly to the pylon and the thrust take-up connecting rod connects the pylon to the hub of the intermediate casing, thereby giving rise to local pinching of these casings that has a negative impact on the performance of the engine.

According to the invention, the exhaust casing 40 is supported by the downstream annular frame 52 of the inner wall 36 of the nacelle by the links 68 that are distributed around the axis of the engine, and it is the downstream frame 52 that is connected to the pylon.

The downstream frame 52 is made of a rigid material such as a nickel-based superalloy, thereby making it possible to spread forces around the perimeter of the exhaust casing 40, and thus avoiding any local pinching thereof.

The downstream suspension means 84 present the advantage of being particularly compact, in particular because they extend in part in the channel of the downstream frame 52, thus enabling the size of the 12 o'clock divider to be reduced and correspondingly increasing the flow space for the secondary stream 34.

The arrangement of the thrust take-up connecting rod 114 connecting the pylon 16 to the downstream frame 52 makes it possible to avoid the connecting rod 114 passing through the inner structure 36 of the nacelle.

Because of the ball joints, the configuration of the downstream suspension means 84 presents flexibility that serves to limit any risk of excessive stress via the downstream suspension.

In a variant, the downstream suspension means may include elastomer elements in order to achieve comparable advantages in terms of flexibility.

According to the invention, the inner structure 36 of the nacelle performs a structural function and serves to limit phenomena of casing distortion and of misalignment of the rotary elements within the engine.

For this purpose, in addition to the downstream frame 52, the longitudinal arms 54, 56, 58, and 60 of the inner structure 36 of the nacelle are likewise made of rigid material, such as a nickel-based superalloy.

Because it is bolted to the inner wall 38 of the intermediate casing, the upstream frame 50 may be made of a lighter material, such as titanium.

The panels 48 of the inner wall 36 of the nacelle are also made of titanium, as are their longitudinal walls 64 and 66 forming the dividers in the flow section for the secondary stream 34.

The walls 64 of the 12 o'clock divider that guide the secondary stream around the pylon 16 are themselves connected to the pylon by flexible connection means and they perform a structuring role.

The hatches 62 in the panels 48 and the hatches in the longitudinal panels 64 and 66 may be made of composite material to achieve a weight saving and to make it easier to install them and remove them when performing maintenance on the engine.

In a variant, the upstream frame 50, the lateral longitudinal arms 58 and 60, and the panels 48 of the inner structure 36 of the nacelle together with their longitudinal walls 64 and 66 for guiding the secondary stream may be made of composite material, in order to achieve a greater weight saving.

Nevertheless, it is preferable for the downstream frame 52 and for the longitudinal arms 54 and 56, respectively at 12 o'clock and at 6 o'clock, to continue to be made of a material providing greater resistance to high temperatures such as a nickel-based superalloy as described above, in order to conserve the structuring properties of the inner structure 36 of the nacelle, and in order to provide a force path that does not include the engine itself in the event of an incident, such as for example a fire or a hot air duct bursting.

The junctions between the rigid metal portions and the portions made of composite material are then provided via flexible connections that accommodate the differential expansion of the materials.

During maintenance operations, the two semicylindrical shells of the outer jacket 26 of the nacelle pivot about their hinges connecting them to the pylon 16 so as to give access to the inner structure 36 of the nacelle. The hatches closing the openings 62 may then be removed to give access to the body of the engine.

Where necessary, the engine may be separated from the pylon 16 and from the outer jacket 26 of the nacelle, while the outer jacket remains attached to the pylon.

In general, the propulsion system of the invention, by limiting casing distortion phenomena, makes it possible to reduce the impact of these phenomena by at least 50% on the specific fuel consumption of the engine.

The reduction in the size of the 12 o'clock divider serves to reduce the extent to which the secondary flow section is obstructed, and thus to increase engine performance, and/or to limit the overall diameter of the nacelle.

The invention also makes it possible to slow down wear of the engine casings by considerably reducing the pinching phenomena that apply to these casings, thereby leading to a reduction in maintenance costs for the propulsion system.

The invention claimed is:

1. An aircraft propulsion system comprising:
    a bypass turbojet engine surrounded by a nacelle defining an annular flow space for a secondary stream; and
    means for attaching the engine to a pylon for fastening to a structural element of an aircraft,
    wherein a downstream portion of the nacelle comprises an inner structure forming a body of revolution that surrounds an annular wall defining an outer boundary of an annular flow space for a primary stream, that extends axially between an annular intermediate casing of the engine and an annular exhaust casing of the engine defining an outer boundary of an outlet of the primary stream, and that defines an inside of a flow section for the secondary stream around a body of the engine,
    wherein the inner structure of the downstream portion of the nacelle comprises a rigid framework including an upstream annular frame fastened by bolting to the intermediate casing of the engine, a downstream annular frame that surrounds the exhaust casing of the engine and that includes support means for supporting the exhaust casing of the engine, and longitudinal arms connecting the upstream and downstream frames together, and
    wherein the annular downstream frame of the inner structure is fastened to the pylon by flexible or hinged suspension means.

2. A propulsion system according to claim 1, wherein the exhaust casing support means comprises links regularly distributed around an axis of the engine having their radially inner ends hinged via ball joints to a rigid cylindrical wall of the exhaust casing, and their radially outer ends hinged via ball joints to the downstream annular frame of the inner structure of the nacelle.

3. A propulsion system according to claim 2, wherein the links extend substantially tangentially to the exhaust casing and in a plane perpendicular to the axis of the engine.

4. A propulsion system according to claim 1, wherein the suspension means for suspending the downstream annular frame comprises links hinged via ball joints and connecting the pylon to a top portion of the downstream frame, together with a thrust take-up connecting rod.

5. A propulsion system according to claim 4, wherein the downstream annular frame comprises a channel-section ring forming an annular channel that is open radially outwards and that includes hinge means for the suspension links.

6. A propulsion system according to claim 4, wherein the suspension links comprise a three-point link of L-shape including one end of a long branch hinged via a ball joint to the downstream annular frame, and including one end of a short branch hinged to one end of another link whose other end is hinged by a ball joint to the downstream annular frame.

7. A propulsion system according to claim 4, wherein the thrust take-up connecting rod is oriented axially downstream from the top portion of the downstream frame.

8. A propulsion system according to claim 1, wherein the pylon includes an upstream portion extending up to the intermediate casing of the engine and connected by three links that are hinged to a top portion of the intermediate casing, two of the links extending substantially radially, while a third link extends substantially tangentially to the intermediate casing.

9. A propulsion system according to claim 1, wherein the upstream and downstream annular frames of the inner structure of the nacelle are connected together by two of the longitudinal arms within a vertical plane with respect to an axis of the engine and extending substantially along the axis of the engine, and by two of the longitudinal arms in within a horizontal plane with respect to the axis of the engine and extending substantially along the axis of the engine.

10. A propulsion system according to claim 1, wherein fairing panels are fastened to the framework of the inner structure of the nacelle and include substantially longitudinal rigid walls for guiding the secondary stream around the pylon, these walls including flexible means connecting them to the pylon.

11. A propulsion system according to claim 10, wherein the fairing panels comprise substantially longitudinal walls extending in a portion of the flow space for the secondary stream that is diametrically opposite from the pylon to guide the secondary stream around services for the engine.

12. A propulsion system according to claim 10, wherein the upstream annular frame and the fairing panels of the inner structure of the nacelle are made of titanium.

13. A propulsion system according to claim 10, wherein at least some of the elements selected from access hatches of the fairing panels, the upstream annular frame, the longitudinal arms, and the fairing panels are made of composite material.

14. A propulsion system according to claim 1, wherein the downstream annular frame and at least some of the longitudinal arms of the inner structure of the nacelle are made of an alloy including nickel.

15. A propulsion system according to claim 1, wherein the nacelle further comprises an outer jacket including two semi-cylindrical shells which are hinged to the pylon, the outer jacking defining an outside of the flow section for the secondary stream around the body of the engine.

16. A propulsion system according to claim 15, wherein the outer jacket is fastened to an outer wall of the intermediate casing and the inner structure of the downstream portion of the nacelle extends from an inner cylindrical wall of the intermediate casing, the inner cylindrical wall of the intermediate casing being connected to the outer wall of the intermediate casing by stator vanes.

\* \* \* \* \*